A. MacPHEE.
TEMPERATURE CONTROLLING APPARATUS.
APPLICATION FILED MAY 13, 1910.
1,038,402.
Patented Sept. 10, 1912.
3 SHEETS—SHEET 2.
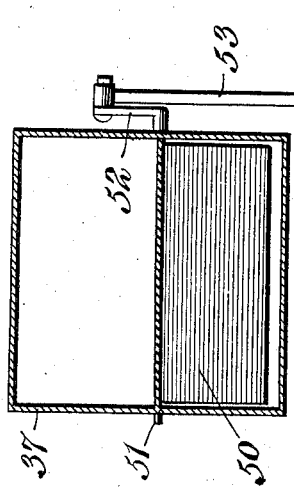
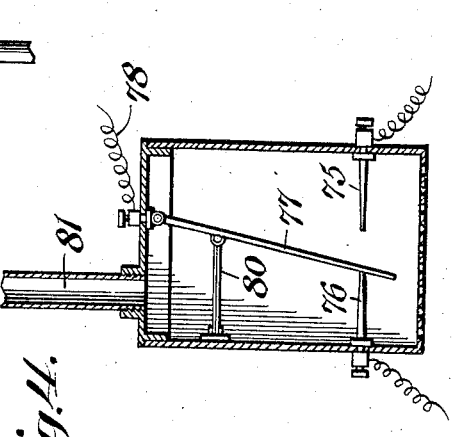
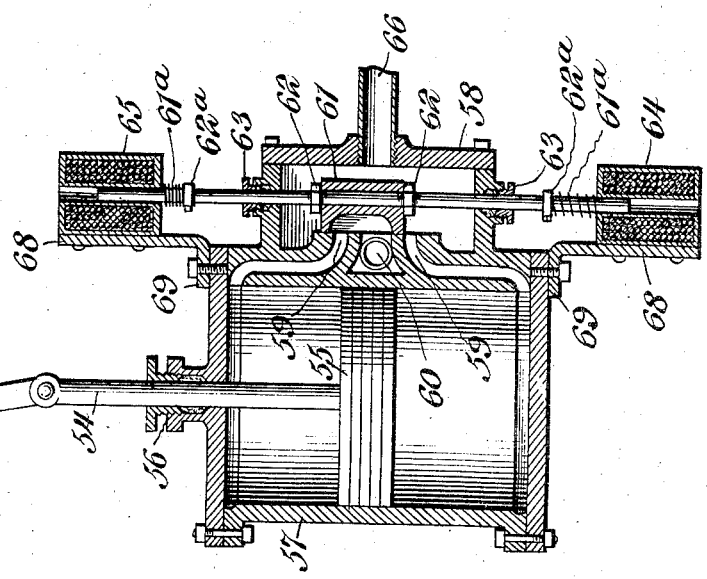
Anderson MacPhee, Inventor,
Witnesses A. MacPHEE.
TEMPERATURE CONTROLLING APPARATUS.
APPLICATION FILED MAY 13, 1910.
1,038,402.
Patented Sept. 10, 1912.
3 SHEETS—SHEET 3.
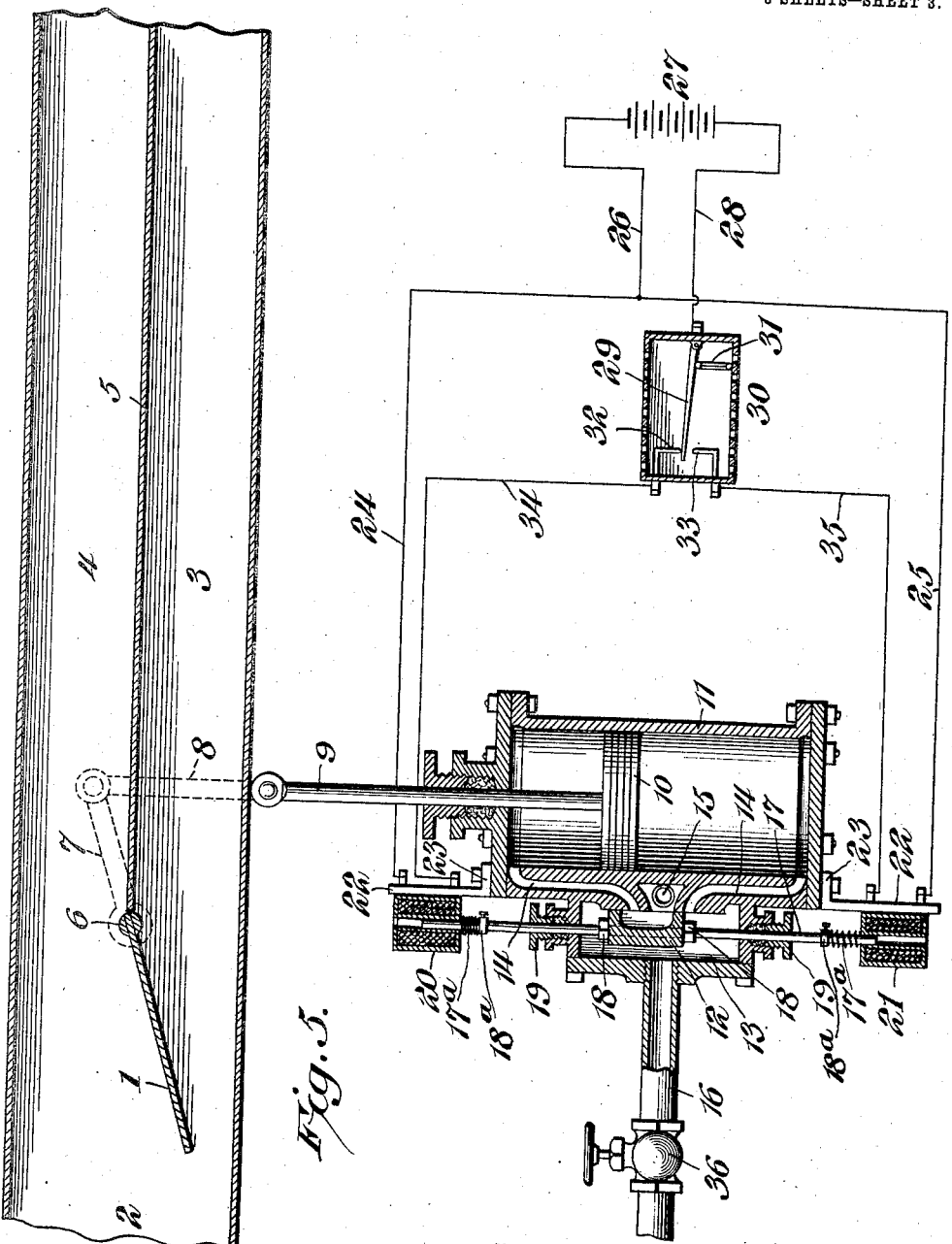
Witnesses
Howard D. Orr.
H. W. Riley
Anderson MacPhee, Inventor,
By E. G. Siggers.
Attorney

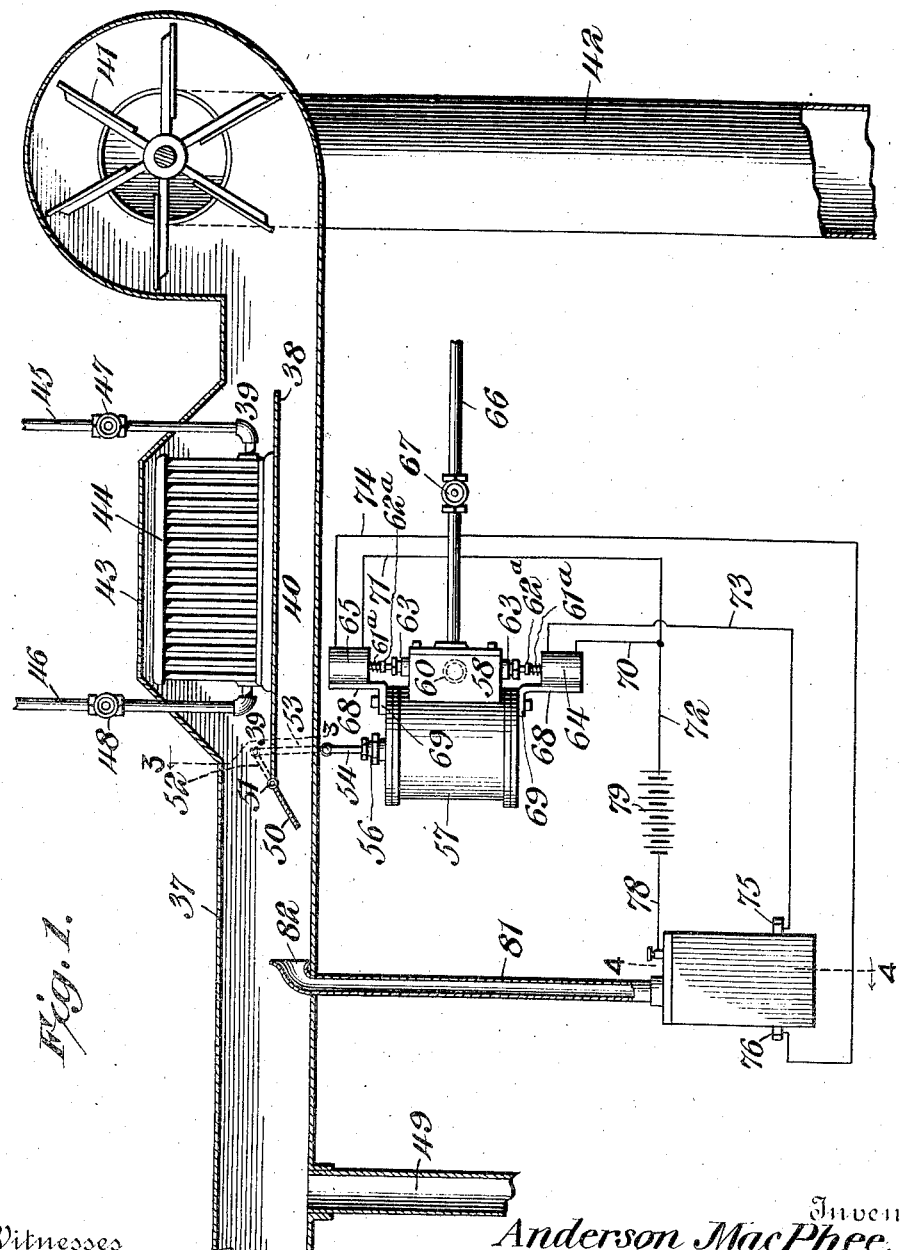

UNITED STATES PATENT OFFICE.

ANDERSON MacPHEE, OF NEW YORK, N. Y.

TEMPERATURE-CONTROLLING APPARATUS.

1,038,402. Specification of Letters Patent. Patented Sept. 10, 1912.

Application filed May 13, 1910. Serial No. 561,182.

*To all whom it may concern:*

Be it known that I, ANDERSON MACPHEE, a subject of the King of Great Britain, residing at New York, in the county of New York and State of New York, have invented a new and useful Temperature-Controlling Apparatus, of which the following is a specification.

The invention relates to a temperature controlling apparatus.

The object of the present invention is to provide a simple, inexpensive and efficient temperature controlling apparatus, designed for regulating the temperature of the air delivered to the living quarters of ships, buildings, store houses, etc., for heating and ventilating or cooling and ventilating the same.

Another object of the invention is to provide a temperature controlling apparatus, equipped with an adjustable mixing damper for varying the relative volumes of air of different temperature, and provided with thermostatically controlled damper actuating mechanism, adapted to be operated by steam from a radiator, boiler, or other source of supply, and provided with means for controlling the flow of steam to the damper actuating mechanism, whereby the mixing damper may be moved as slowly as desired, so as to prevent sudden fluctuations in the temperature of the air delivered to the apartments.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is an elevation partly in section of a temperature controlling apparatus, constructed in accordance with this invention, and showing the preferred form of the invention. Fig. 2 is an enlarged sectional view, illustrating the construction of the damper actuating mechanism. Fig. 3 is a transverse sectional view, taken substantially on the line 3—3 of Fig.
1. Fig. 4 is an enlarged sectional view on the line 4—4 of Fig. 1. Fig. 5 is a vertical sectional view, illustrating a simpler form of the invention.

Like numerals of reference designate corresponding parts in all the figures of the drawings.

In the embodiment of the invention illustrated in Fig. 5, in which is shown the simpler form of the invention, 1 designates a pivotally mounted mixing damper, operating in a mixed air conduit 2 and located at the juncture of hot and cold air ducts 3 and 4, preferably formed by dividing a portion of the conduit 2 by a central longitudinal partition 5, but the conduit and the hot and cold air ducts may be constructed in any preferred manner, as will be readily understood. The mixed air conduit is designed to be connected by suitable branches to the various apartments to be heated and ventilated or cooled and ventilated. In practice the cold air duct will be a fresh air duct, or a duct supplied with air from the outside atmosphere, and while I have termed the duct 3 a hot air duct, it may be utilized in warmer climates as a conduit for cold air of a lower temperture than the fresh air duct 4, so that such cold air will operate as the cooling medium for lowering the temperature of the fresh air. The mixing damper 1 is preferably pivoted at 6 to the adjacent end of the partition 5, and it is provided with an exterior arm 7 and is adapted to swing across the conduit to constrict to a greater or less degree the discharge end or outlet of either of the ducts 3 and 4. The arm 7 of the damper is connected by a link 8 with a rod 9 of a piston 10, operating within a cylinder 11 and controlled by a slide valve 12. The slide valve is mounted within a steam chest 13, having inlet ports 14 leading to the ends of the cylinder. The steam chest is also provided with a central exhaust port or passage 15, designed in practice to be connected with a condenser (not shown). A steam supply pipe 16 is connected with the steam chest, and the slide valve is adapted to be shifted to admit steam to one of the inlet ports or passages, and to connect the other port or passage with the exhaust port or passage, and when steam is admitted to one end of the cylinder, it is exhausting from the opposite end of the cylinder. The cylinder, the piston and the valve constitute a motor and various forms may be employed for actuating the damper. The slide valve is provided with a bore or opening and is secured to the center of a valve stem 17 by nuts 18, mounted on the valve stem and engaging the valve at the opposite ends thereof, but any other suitable means may be employed for securing the valve to the valve stem. The nuts, however, provide an adjustable connection so that the valve may be properly positioned with relation to the ports or passages of the valve chest. The valve rod, which passes through stuffing boxes 19 at opposite ends of the valve or steam chest, extends from the same in opposite directions and has its terminal portions arranged in solenoids 20 and 21, mounted on suitable brackets 22 having attaching portions 23 secured to the cylinder heads, but the solenoids may be supported in any other suitable manner. The solenoids 20 and 21 may be of any preferred construction, but are preferably provided with metallic casings, as indicated, in order to increase their strength. The valve stem or the terminal portions thereof are constructed of soft iron, or other suitable material so as to be attracted by the solenoids when either is energized. The outer terminals of the solenoids are connected by wires 24 and 25 with a common battery wire 26, which is connected with one of the poles of a battery 27. The other pole of the battery 27 is connected by a wire 28 with a pivotally mounted pointer or member 29 of a thermostat 30. Instead of a battery any other source of electric supply may be utilized for energizing the solenoids. The thermostat 30, which is provided with a suitable casing, may be of any preferred construction and the pivotally mounted pointer or member 29 is connected with one side of the casing by an expansible contractile bar or connection 31, secured at one end to the pivoted member 29 and at the other end to one side of the casing, and adapted to be affected in the usual manner by variations in the temperature. The pivoted member 29 moves between spaced contacts 32 and 33, connected by wires 34 and 35 with the inner terminals of coils of the solenoids. When the temperature to which the thermostat is subjected lies above a predetermined point, the pivoted member of the thermostat will be moved to the contact 32, which will close the circuit of the solenoid 20, which will be energized and which will attract the valve rod and slide the valve to the right. This will admit steam to the lower end of the cylinder, and the piston will be moved toward the upper end, thereby operating the mixing damper and causing the same to close down at the outlet of the hot air duct. As soon as the temperature is lowered sufficiently, the sensitive bar or element 31 of the thermostat will contract and carry the pivoted member 29 away from the contact 32, which will break the circuit in which the solenoid 20 is placed. When the temperature falls below a predetermined point, the contraction of the sensitive bar or element 31 will carry the pivoted member 29 to the other contact 33, which will close the circuit at that side of the thermostat and energize the solenoid 21. The solenoid 21 will attract the valve rod and move the valve to its opposite position, and the mixing damper will be moved in the opposite direction and caused to close down on the cold air duct and open the hot air duct. The movement of the mixing damper may be made exceedingly slow by means of a valve 36, placed in the steam pipe and adapted to control the flow of steam to the steam chest. By controlling the flow of steam in this manner, the device may be regulated so that it will require ten or fifteen minutes for the piston to travel from one end of the cylinder to the other. The temperature in the room may be maintained within a few degrees of a predetermined point, as any rise in the temperature will operate to move the damper in one direction, and a corresponding fall in the temperature will move the damper in the opposite direction. When through the movement of the damper the temperature has been changed sufficiently to withdraw the pivoted member from the contact, the circuit will be broken and the damper will remain in its adjusted position until conditions produce a further adjustment of the said damper. This is effected by means of a pair of coiled springs 17$^a$, disposed on the valve stem 17 and preferably interposed between adjustable collars 18$^a$ and the casings of the solenoids. The springs, however, may be of any preferred form and may be arranged in any other desired manner for automatically actuating the valve rod or stem for moving the valve 12 to a central position for shutting off the steam from each end of the cylinder. In practice, the cylinder, the piston and the valve mechanism will be comparatively small and only a relatively small amount of valve travel will be necessary. The solenoids will be of sufficient strength to actuate the valve rod or stem and compress one of the springs thereof. The springs will center the valve and maintain the same in such position when the valve rod or stem is arranged vertically, or in any other position in which it may be advisable to place it.

In the embodiment of the invention illustrated in Figs. 1 to 4 inclusive is illustrated the preferred form of the invention in which a conduit 37 is divided by a longitudinal partition 38 into a hot air duct 39 and a cold air duct 40. A fan or blower 41 is arranged at the inlet end of the conduit 37, and a fresh air supply pipe 42 is connected with the eye of the fan. The partition 38 divides the air, a portion passing through the warm air duct 39 and a portion through the cold air duct 40. The conduit 37 is enlarged at 43 at the hot air duct 39 to form a casing for a heating device 44, preferably in the form of a steam radiator, provided with feed and return pipes 45 and 46, having controlling valves 47 and 48. Instead of steam, brine from a refrigerating plant, or any other cooling medium may be passed through the pipe for cooling the air when necessary. The conduit 37 is connected by suitable branches 49 with the rooms or apartments to be ventilated and heated or cooled, and the temperature of the air delivered to such rooms or apartments is regulated by means of a mixing damper 50, pivoted at 51 to the longitudinal partition 38 at the juncture of the hot and cold air ducts, and provided with an exterior arm 52, which is connected by a link 53 with the rod 54 of a piston 55. The piston rod 54 extends through a suitable stuffing box 56 at one end of a cylinder 57 in which the piston operates. The cylinder is equipped with a steam chest 58 having inlet ports 59 leading to the ends of the cylinder. The steam chest is also provided with a centrally arranged exhaust port or passage 60, and the admission and exhaust steam is controlled by a slide valve 61, constructed and operating similar to the valve 12 heretofore described, and secured to the center of a valve rod by nuts 62. The valve rod passes through stuffing boxes 63 at the ends of the valve chest, and its terminal portions are arranged in solenoids 64 and 65 and are adapted to be attracted by the same, whereby the valve is shifted from one position to the other. The end portions of the valve stem or rod are equipped with coiled springs 61$^a$, interposed between adjustable collars 62$^a$ and the casings of the solenoids 64 and 65, and operable to center the valve in the manner heretofore explained to cut off the steam from the cylinder and cause the damper to remain in its adjusted position. The steam is admitted to the valve chest by means of a pipe 66, equipped with a valve 67 for controlling the flow of steam to the valve chest, so that the piston may be made to travel as slowly as desired. The solenoids 64 and 65 are supported by suitable brackets 68, having attaching portions 69 secured to the heads of the cylinder. The lower terminals of the solenoids are connected by wires 70 and 71 with a battery wire 72, and the other terminals of the solenoids are connected by wires 73 and 74 with spaced contacts 75 and 76 of a thermostat, constructed substantially the same as that heretofore described and having a pivoted member 77, connected by a battery wire 78. The battery wires 72 and 78 are connected with the poles of a battery 79, or other source of electric supply. The pivoted member 77, which is adapted to swing between the spaced contacts 75 and 76, is connected with one side of the casing by a sensitive bar or element 80, which when the temperature within the thermostat rises above a predetermined point and moves the pivoted member to the contact 75 and which when the temperature within the thermostat falls below a predetermined point contracts and swings the pivoted member 77 against the contact 76. The thermostat is connected by a pipe 81 with the mixed air conduit 37, and has a flaring or funnel-shaped inlet or mouth 82, located within the mixed air conduit in line with the cold air duct, and adapted to receive a portion of the mixed air for conducting the same to the thermostat casing. The thermostat by being connected with the mixed air or distributing duct at the point where the air is mixed enables the temperature of such mixed air to be controlled without placing thermostats in the various rooms or apartments to be ventilated and cooled or heated, thereby greatly simplifying the apparatus and reducing the cost of the same and enabling the entire apparatus to be located practically at a single point or place instead of at points more or less remote from another.

The mixing damper and the mechanism for actuating the same may be applied to various indirect heating systems where hot and cold air are mixed preparatory to distributing the same to the various rooms or apartments to be ventilated or heated and cooled.

Having thus fully described my invention, what I claim as new and desire to secure by Letters Patent, is:—

1. A temperature controlling apparatus comprising hot and cold air ducts, a damper arranged to vary the relative volumes of air discharged from the said ducts, a motor connected with the damper and having a controlling valve provided with a projecting stem, thermostatically operated means for actuating the valve including a pair of solenoids co-acting with the valve stem, and means for automatically moving the valve to a central position to cut off the motive power and stop the damper at an intermediate point.

2. In a temperature controlling apparatus, the combination of a movable damper, a cylinder, a piston operating in the cylinder and connected with the damper, a valve chest, solenoids mounted at opposite ends of the valve chest, a valve for controlling the admission of motive fluid to the cylinder, a valve stem connected with the valve and projecting beyond the ends of the valve chest and extending into the said solenoids and co-acting therewith, a thermostat, thermostatically operated circuits connected with the solenoids, and means for automatically centering the valve for cutting off the motive power, whereby the damper may be stopped at an intermediate point of its travel.

3. In a temperature controlling apparatus, the combination of a movable damper, a cylinder, a piston operating in the cylinder and connected with the damper, a valve chest, a valve for controlling the admission of motive fluid to the cylinder, brackets mounted on the cylinder at the end of the valve chest, solenoids supported by the brackets, a valve stem connected with the valve and projecting from the valve chest and adapted to be drawn into either of the solenoids and co-acting directly therewith, thermostatically controlled circuits for operating the solenoids, and springs mounted on the valve chest and arranged to engage the solenoids for centering the valve to cut off the pressure when the circuits are broken, whereby the damper may be stopped at an intermediate point of its travel.

4. A temperature controlling apparatus comprising hot and cold air ducts, a mixed air conduit, a mixing damper arranged to close or partially close either of the said ducts, and a piston connected with the damper, a cylinder receiving the piston and having a valve chest, a valve for controlling the admission of a motive fluid to the cylinder, a valve stem connected with the valve and extending beyond the valve chest, opposite solenoids arranged to receive and attract the valve stem for actuating the valve, a thermostat including a movable member, spaced contacts between which the said member moves, a sensitive element connected with the said member, a source of electric supply, and separate circuits connected with the solenoids, the electric supply and the contacts and movable member of the thermostat.

5. A temperature controlling apparatus including a mixed air conduit, a partition extending longitudinally of the conduit and dividing a portion of the same into hot and cold air ducts, a fan or blower for forcing air through the ducts, a heating device arranged in the hot duct, a mixing damper arranged in the partition for varying the relative volumes of air delivered to the mixed air conduit, a motor connected with the damper and provided with a pressure controlling valve, thermostatically controlled means for operating the valve, and means for automatically centering the valve and for returning the same to a central position when released by the thermostatically controlled means, whereby the power may be cut off and the damper stopped at an intermediate point of its travel.

6. A temperature controlling apparatus comprising hot and cold air ducts, a damper arranged to vary the relative volumes of air discharged from the said ducts, a motor connected with the damper and having a pressure controlling valve provided with a projecting stem, thermostatically operated means for actuating the valve including a pair of solenoids arranged to coöperate with and directly receive the valve stem, and means for automatically centering the valve to cut off the pressure when the valve stem is released by the solenoids, whereby the damper may be stopped at an intermediate point of its travel.

7. A temperature controlling apparatus comprising hot and cold air ducts, a damper arranged to vary the relative volumes of air discharged from the said ducts, a motor connected with the damper and having a pressure controlling valve provided with a projecting stem, thermostatically operated means for actuating the valve including a pair of solenoids arranged to coöperate with and directly receive the valve stem, and a spring for centering the valve to cut off the pressure when the said valve is released by the solenoids, whereby the damper may be stopped at an intermediate point of its travel.

8. A temperature controlling apparatus comprising hot and cold air ducts, a damper arranged to vary the relative volumes of air discharged from the said ducts, a motor connected with the damper and having a pressure controlling valve provided with a projecting stem, thermostatically operated means for actuating the valve including a pair of solenoids arranged to coöperate with and directly receive the valve stem, and coiled springs mounted on the valve stem and engaging the solenoids for automatically centering the valve to cut off the power when the valve is released by the solenoids, whereby the damper may be stopped at an intermediate point of its travel.

9. A temperature controlling apparatus comprising hot and cold air ducts, a damper arranged to vary the relative volumes of air discharged from the said ducts, a motor connected with the damper and having a pressure controlling valve provided with a projecting stem, thermostatically operated means for actuating the valve including a pair of solenoids arranged to coöperate with and directly receive the valve stem, adjustable means mounted on the valve stem in spaced relation with the solenoids, and coiled springs disposed on the valve stem and interposed between the said adjustable means and the solenoids for automatically centering the valve to cut off the pressure when the circuits are broken, whereby the damper may be stopped at an intermediate point of its travel.

10. A temperature controlling apparatus including hot and cold air ducts, a mixed air conduit, a mixing damper arranged to vary the relative volumes of air delivered to the mixed air conduit, a thermostat having a casing, a duct extending from the thermostat casing to the mixed air conduit, a motor having a pressure controlling valve and connected with the damper for actuating the latter, means for normally maintaining the valve in a central position and for automatically returning the valve to such position to cut off the pressure, and means operated by the thermostat for actuating the valve.

In testimony that I claim the foregoing as my own, I have hereto affixed my signature in the presence of two witnesses.

ANDERSON MacPHEE.

Witnesses:
 LAURA E. SMITH,
 A. V. MANTLE.